Oct. 22, 1935.  R. HALL  2,018,613
FLEXIBLE SEAL EXPANSION JOINT
Filed Oct. 18, 1934
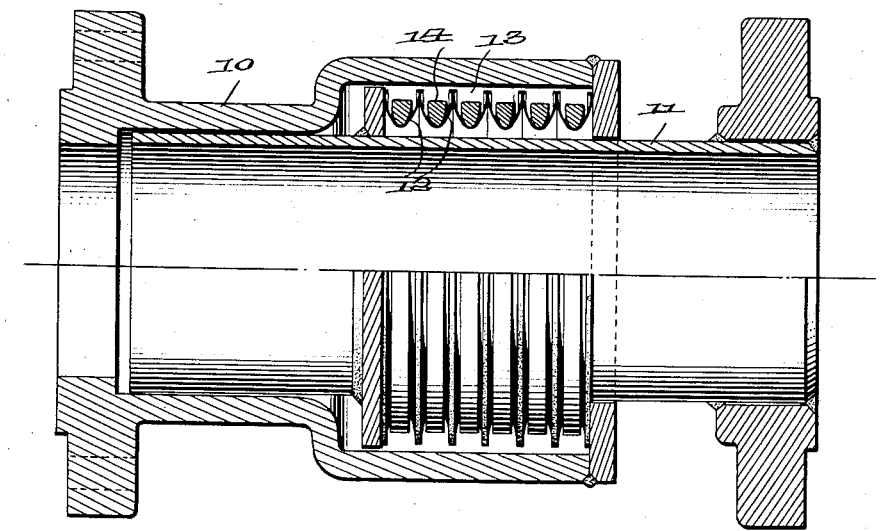
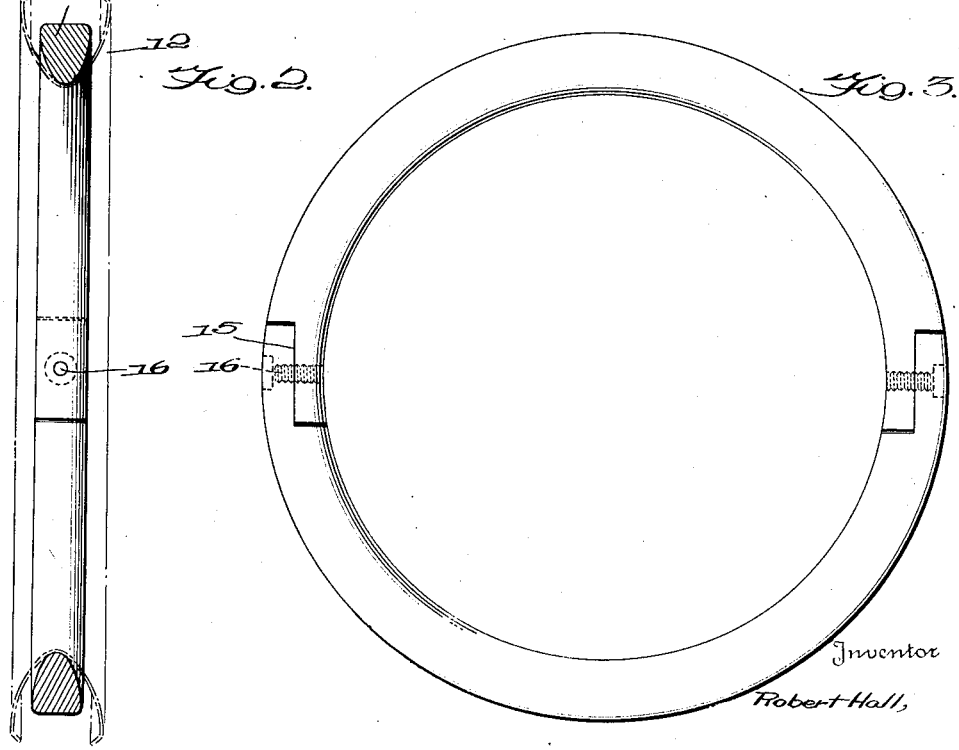
Inventor
Robert Hall,
By Edmund N. Pany
Attorney Patented Oct. 22, 1935

2,018,613

UNITED STATES PATENT OFFICE 2,018,613

FLEXIBLE SEAL EXPANSION JOINT

Robert Hall, Lockport, N. Y., assignor to American District Steam Company, North Tonawanda, N. Y., a corporation of New York Application October 18, 1934, Serial No. 748,955

4 Claims. (Cl. 285—162)

This invention relates to expansion joints employed in pipe lines to take care of contraction and expansion such as occur under variations in temperature conditions, and is particularly directed to an improvement in the flexible type expansion joints forming the subject-matter of my prior pending application Serial No. 729,677, filed June 8th, 1934. Essentially the invention involves augmenting the novel flexible sealing member of said prior joint by a supplemental structure, function to improve operation and serving further to increase durability and period of useful life by overcoming certain weaknesses which may occur in the flexible material employed, arise incident to manufacture of the flexible member, or develop under unfavorable operating conditions.

In the joint shown and described in my previous application the flexible tubular member interposed between and sealing the relatively movable joint parts is formed of flexible metal to comprise a continuous series of annular sections of U-shaped, and preferably catenary cross-section, all with their hollow side facing in the direction from which the joint pressure is applied and with the complementary walls of adjacent annuli in abutting relation so as to be mutually self-supporting and enabling the line pressure as applied to the hollow faces to offset strains and stresses which may develop through elongation and compression of the flexible member under operation of the joint.

It is important, of course, that contraction and expansion of the flexible member be equally distributed through the length thereof between the entire series of annular sections. This is accomplished according to the present invention with an arrangement which offsets any unbalanced condition existing in different longitudinal parts of the flexible member which arise as between the various annular sections due to differences in flexibility, thickness of or weakness in the metal employed, or from other causes. The structure employed includes a series of rigid elements in association with the successive U-shaped elements of such character and so disposed as to equalize the flexing of the individual annuli and prevent the concentration in any particular section or group of sections of the flexible member of stresses and strains such as might produce breakage in the member and disrupt the operation of the joint.

For a full understanding of the structure and operation of the invention, reference is made to the accompanying drawing in connection with a detailed description thereof.

In the drawing:

Fig. 1 is a view in longitudinal section of an expansion joint structure constructed to embody the present invention;

Fig. 2 is an enlarged view partially in section illustrating a part of the structure shown in Fig. 1;

Fig. 3 is a plan view of an essential element of the invention and corresponding in part to the sectional view of Fig. 2.

The basic structure to which the invention is applied comprises, as shown in Figure 1, a pair of relatively movable joint members 10 and 11, preferably telescopically associated, and a longitudinally extensible and contractable flexible tubular member, comprising a series of annular hollow sections 12, interposed as a seal therebetween. As fully explained in the above-identified application, the successive annular sections 12 are all similarly shaped with their adjacent side walls in abutting relation so that their hollow faces are all exposed on the same side of the flexible member which they compose. An important feature of the prior invention includes arranging the flexible member in such relation to the joint parts that the line pressure from within the joint is applied to the hollow faces of all of the annular sections, and this feature is taken advantage of in carrying out the present invention. To enable the proper application of pressure to the flexible member in the manner just indicated, the joint parts 10 and 11 can be constituted as shown in the drawing to provide a chamber 13 which houses the flexible member. It will be noted that the pressure from within the joint is transmitted to the outer portion of the chamber 13 so as to be applied to the outer side of the flexible member on which face the hollow sides of the U-shaped series.

The present invention employs in association with each of the U-shaped flexible sealing member sections a rigid element 14 which may best be characterized as equalizing members. Such rings are supported solely through their association with the annuli of the flexible member and have no outside supporting or guiding connection with the joint parts. The rings are interposed in the hollow faces of the various U-shaped sections 12 and are of such diameter as to closely fit and be supported by the bottom of the U. It has been found from tests that the sections of the flexible member do not tend to undergo changes in diameter in their longitudinal expansive and contractive movement so that it will be understood that the rings are firmly supported through the arrangement just indicated.

The rings are smaller and rounded at their inner periphery to have a firm but limited contact with the bottom end of the U-shaped annuli. Like the annuli, themselves, the rings are also U-shaped and increase gradually in width to a maximum at their outer periphery. The taper of the rings 14, however, is less abrupt than that of the annuli and throughout their sides and at their outer end the rings are in spaced relation to the opposing walls of the U-shaped members so as not to impede the normal flexing movement thereof. The relationship between the flexible and rigid members will be readily understood from the enlarged view shown in Figure 2.

As indicated, the rings while having generally smaller proportions in respect to width conform in their general shape to the annular sections, and it may be further explained that their exact shape is such as will be assumed by the annular sections when the latter are compressed to the limit allowable without danger of overcompression, breakage or buckling. In the preferred form the flexible sealing member sections take the shape of a catenary curve so that the pressure applied to the hollow face will not tend to distort the shape or cause any undue strain. Such idea can be carried out in the improved construction of the present invention by making the rigid rings 14 of catenary form but with the reduced proportions mentioned.

In order to enable the rings to be applied to the U-shaped sections 12, they are constructed in two sections as shown in Figure 3. They should have a smooth overall surface for obvious reasons and to this end will preferably be formed with an overlap joint 15 between the two semi-circular parts. The two parts may be made rigid by any suitable means such as the screws 16. The rings can conveniently be made of semi-steel, 50% case iron and 50% steel, although any strong metal which does not tend to warp under temperature changes may be suitably employed. They can be formed by casting, and in such event they should normally be machined to eliminate any surface irregularities.

Having a snug fit with the bottom of the hollow annuli 12, it will be understood that the rings do not shift from their central position in the annuli but are firmly held in upstanding position to provide a clearance of gradually increasing proportions with the complementary side walls of the annuli. The rings will be of substantial height. In the embodiment shown they are approximately two-thirds the height of the U-shaped annuli, but while such proportions are not entirely essential it is desirable that the rings terminate below the periphery of the abutting edges of adjacent annuli where the annuli are separately formed and joined at their edges in a welded joint. To avoid any creasing action or cutting of the surface of the flexible annuli, the outer edges of the rings will preferably be slightly rounded.

In operation the equalizing rings will limit the compression which the annular sections undergo during contraction of the flexible member. As the opposing walls of each annular section are compressed towards each other, their area of contact is gradually increased incident to flattening out and a limit will be reached at the upper widest portion of the rings which will effectually prevent further compression of the individual flexible sections. It may be said that the various rings operate as individual stops to limit the contraction of the individual annuli with which they are associated. Thus, the degree of movement of the whole series of flexible annuli will be equalized. Even though one or more of the annuli be weaker than the others, no serious strain will be concentrated thereon since as soon as they have reached their maximum limits of compression they will be fully reinforced by the whole area of the rigid rings of similar shape and any further compression in the joint will be distributed and taken up by the other annuli which are stronger and less flexible.

While the flexible annuli as heretofore indicated do not tend to change in diameter within their normal range of operation, it will be appreciated that if there is any tendency in this direction upon undue expansion, such distortion will be effectually resisted by reason of the snug contact between the rounded bottom of the flexible annuli and the inner ends of the rigid rings. This function, of course, is additional to the spacing and equalizing action of the rings upon contraction of the flexible member sections.

I am aware that it has hitherto been proposed to insert reinforcing rings in a corrugated flexible member of an expansion joint to enable the member to withstand pressure. The present invention is distinguishable from such an arrangement both in structure and function. In the present joint, all of the hollow annular areas of the flexible member face on the same side, this being the side to which the line pressure is applied. The rigid equalizing rings in the improved form of joint are applied on the same hollow side of the annuli. They therefore do not serve to withstand pressure as this is unnecessary to the particular construction by reason of the fact that the U-shaped configuration of the successive annuli is such that they mutually reinforce each other by reason of the equal pressure applied to their abutting walls.

I claim:

1. In an expansion joint, a tubular sealing member constituted as a series of successive U-shaped annular flexible sections having their hollow faces all disposed on the side of the member which is subject to pressure from within the joint, and a series of rigid rings all located on the side of the flexible member to which the pressure is applied seating in the hollows of all the various annular sections and snugly engaging the rounded bottoms thereof, said rings being narrower than the width of the U-shaped sections but spacing the opposite flexible side walls of the sections and conforming generally to the contour assumed thereby when the sections are compressed to a predetermined extent so as to engage said walls of the sections when the flexible member as a whole is compressed and thus distribute the total compression of the member equally between all of the annular sections.

2. In an expansion joint, a flexible tubular sealing member constituted as a series of annular hollow areas of curved contour all facing on the pressure side of the member and with the complementary walls of adjacent annular areas in abutting relation, and a series of rigid rings all located on the pressure side of the member and seating in all the annular hollows snugly fitting and supported by the bottom of such areas, said rings increasing gradually in cross-section from their bottom ends to a maximum width less than the normal width of the hollow areas and presenting opposing surfaces disposed in spaced relation with and conforming generally in contour to the opposite walls of the hollow areas.

3. In an expansion joint, a tubular sealing member constituted as a series of successive U-shaped annular flexible sections having their hollow faces all on the side of the member which is exposed to pressure from within the joint and with the complementary walls of adjacent annular sections in abutting relation at their edges, and a series of rigid equalizing rings all located on the same side of the flexible member and disposed in the hollows of all said annular sections seating snugly in and supported by the bottoms of the hollows, said rings having a rounded inner periphery more abrupt than the rounded bottoms of the annular sections, and having opposing side walls shaped to complement the opposite walls of the sections but extending outwardly from their inner periphery in diverging spaced relation to said opposing side walls.

4. In an expansion joint, a tubular sealing member constituted as a series of successive U-shaped annular flexible sections having their hollow faces all on the pressure side of the member and with the complementary walls of adjacent annular sections in abutting relation at their edges, and a series of rigid equalizing rings all located on the pressure side of the flexible member and disposed in the hollows of all said annular sections seating snugly in and supported by the bottoms of the hollows, said rings having a rounded inner periphery narrower than the rounded bottoms of the annular sections, and having side walls shaped to complement the contour assumed by the opposite section walls when compressed to a desired limit but normally disposed in spaced relation thereto to provide for compression and changes in contour of the annular sections.

ROBERT HALL.